United States Patent
Forsberg et al.

(10) Patent No.: US 6,896,273 B2
(45) Date of Patent: May 24, 2005

(54) LADDER DOLLY

(76) Inventors: Kevin Forsberg, 2917 Cleburne Rd., Orlando, FL (US) 32817; Isaac D. M. White, 2886 Plaza Terrace Dr., Orlando, FL (US) 32805

( * ) Notice: Subject to any disclaimer, the term of this patent is extended or adjusted under 35 U.S.C. 154(b) by 0 days.

(21) Appl. No.: 10/180,594

(22) Filed: Jun. 26, 2002

(65) Prior Publication Data

US 2004/0108671 A1 Jun. 10, 2004

(51) Int. Cl.$^7$ ................................................. B62B 5/00
(52) U.S. Cl. ................ 280/79.11; 280/79.3; 280/47.34; 182/20
(58) Field of Search ............................. 280/47.33, 47.3, 280/47.31, 47.28, 47.32, 47.35, 47.34, 47.19, 79.3, 79.7, 79.6, 79.11, 79.4, 47.17, 47.24, 47.26, 47.27, 47.29, 47.331, 645, 651; 182/20, 127, 116; 242/557, 594.4; 211/206, 182, 189; 248/176.1, 172, 107, 675

(56) References Cited

U.S. PATENT DOCUMENTS

| | | | |
|---|---|---|---|
| 750,402 A | | 1/1904 | Sechler |
| 849,290 A | * | 4/1907 | Vanderbilt ............... 248/176.1 |
| 855,219 A | * | 5/1907 | Anthony, Jr. ............... 248/172 |
| 2,533,324 A | * | 12/1950 | Mendle ....................... 211/206 |
| 2,707,288 A | * | 5/1955 | Sands ....................... 280/79.11 |
| 2,750,983 A | * | 6/1956 | Rogers ..................... 280/79.11 |
| 3,612,218 A | | 10/1971 | Blair |
| 3,666,054 A | | 5/1972 | Ellings et al. |
| 3,701,226 A | | 10/1972 | Fulcher |
| 3,731,947 A | | 5/1973 | Fontaine |
| 3,857,460 A | | 12/1974 | Nini |
| 3,945,510 A | | 3/1976 | Saul, Jr. et al. |
| 3,954,155 A | | 4/1976 | Guidara |
| 3,991,852 A | | 11/1976 | Brookes et al. |
| 4,009,762 A | | 3/1977 | Bjerkgard |
| 4,106,590 A | | 8/1978 | Tarran |
| 4,360,211 A | | 11/1982 | Blake |
| 4,428,456 A | | 1/1984 | Rohde |
| 4,471,969 A | | 9/1984 | Zabala et al. |
| 4,493,392 A | | 1/1985 | Alimbau Marques |
| 4,494,626 A | | 1/1985 | Ast |
| 4,564,203 A | | 1/1986 | Wilson |
| 4,690,248 A | | 9/1987 | Killeen |
| 4,711,407 A | | 12/1987 | Boon |
| 4,828,073 A | | 5/1989 | Friday |
| 4,923,050 A | | 5/1990 | Vitols |
| 5,102,154 A | | 4/1992 | McDonald |
| 5,105,908 A | | 4/1992 | Freund |
| 5,140,720 A | | 8/1992 | Sisler |
| 5,362,078 A | | 11/1994 | Paton |
| 5,382,032 A | | 1/1995 | Wilson |
| 5,505,425 A | * | 4/1996 | Shelton ...................... 248/172 |
| 5,556,064 A | * | 9/1996 | Cowe ......................... 248/172 |
| 5,562,271 A | * | 10/1996 | Davis, Jr. ................... 248/675 |
| 5,577,745 A | | 11/1996 | Birk |

(Continued)

*Primary Examiner*—Christopher P. Ellis
*Assistant Examiner*—Hau Phan
(74) *Attorney, Agent, or Firm*—Walters & Zimmerman; Geoff Sutcliffe; Todd Mitchem

(57) ABSTRACT

A dolly is disclosed for transporting a ladder. The dolly has a main frame, a ladder brace, and a ladder stop. The main frame has a first end, second end, and a single longitudinal frame member extending between the first end and the second end. The ladder brace upwardly extends from the first end of the main frame and supports one end of the ladder. The ladder stop upwardly extends from the second end of the main frame and engages a rung of the ladder. The dolly extends in length and height to accommodate various ladder lengths, and the dolly collapses for easy carrying and stowing. The dolly allows a user to transport the ladder with less lifting and, thus, less injury.

6 Claims, 19 Drawing Sheets

U.S. PATENT DOCUMENTS

| | | | |
|---|---|---|---|
| 5,655,734 A | | 8/1997 | Duhl |
| 5,660,637 A | * | 8/1997 | Dodge ........................ 211/206 |
| 5,727,799 A | | 3/1998 | DiSario |
| 5,882,023 A | | 3/1999 | Swager |
| 5,893,572 A | | 4/1999 | Parks |
| 6,116,533 A | * | 9/2000 | Elder ...................... 280/47.35 |
| 6,173,811 B1 | | 1/2001 | Tornabene et al. |
| 6,182,920 B1 | | 2/2001 | Watkins |
| 6,206,386 B1 | * | 3/2001 | Briggs ...................... 280/79.11 |
| 6,209,681 B1 | | 4/2001 | DiSario |
| 6,270,094 B1 | | 8/2001 | Campbell |
| 6,322,061 B1 | * | 11/2001 | Maser et al. ................ 269/296 |
| 6,338,518 B1 | | 1/2002 | D'Annunzio et al. |
| 6,401,948 B1 | * | 6/2002 | Huang ........................ 211/206 |
| 6,419,245 B1 | * | 7/2002 | Trimble .................. 280/79.11 |

* cited by examiner

US 6,896,273 B2

LADDER DOLLY

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to dollies and, more particularly, to a dolly for enabling an individual to load a ladder onto the dolly and for transporting the ladder to a work site.

2. Description of the Related Art

U.S. Pat. No. 6,182,920 issued to Watkins (Feb. 6, 2001) shows a collapsible dolly for dispensing cable. U.S. Pat. No. 6,209,681 (Apr. 3, 2001) and U.S. Pat. No. 5,727,799 (Mar. 17, 1998) issued to DiSario each show a ladder caddy having a single-wheeled frame supporting one end of a ladder. U.S. Pat. No. 4,360,211 issued to Blake (Nov. 23, 1982) shows a sheet metal dolly having removable trusses. U.S. Pat. No. 4,009,762 issued to Bjerkgard (Mar. 1, 1977) shows a ladder carrier having a pair of parallel frame members and at least four (4) transverse frame members.

BRIEF SUMMARY OF THE INVENTION

This invention is a ladder dolly. An individual loads the ladder on the ladder dolly, and the individual pushes or pulls the ladder dolly to the work site. Because the ladder dolly supports the weight of a ladder, the individual does not need to carry the ladder to the work site. The individual need not support the ladder on the individual's shoulder. Because the ladder dolly supports the weight of the ladder, the ladder dolly conveniently allows the individual to transport the ladder to the work site. The ladder dolly may also include features to help stow and retrieve the ladder from atop a van, and the ladder dolly may collapse and fold for compact storage.

One embodiment of this invention describes a ladder dolly for transporting a ladder. The ladder dolly has a main frame, a ladder brace, and a ladder stop. The main frame has a first end, a second end, and a single longitudinal frame member extending between the first end and the second end. The ladder brace upwardly extends from the first end of the main frame and supports one end of the ladder. The ladder stop upwardly extends from the second end of the main frame and engages a rung of the ladder.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

Figure 1:
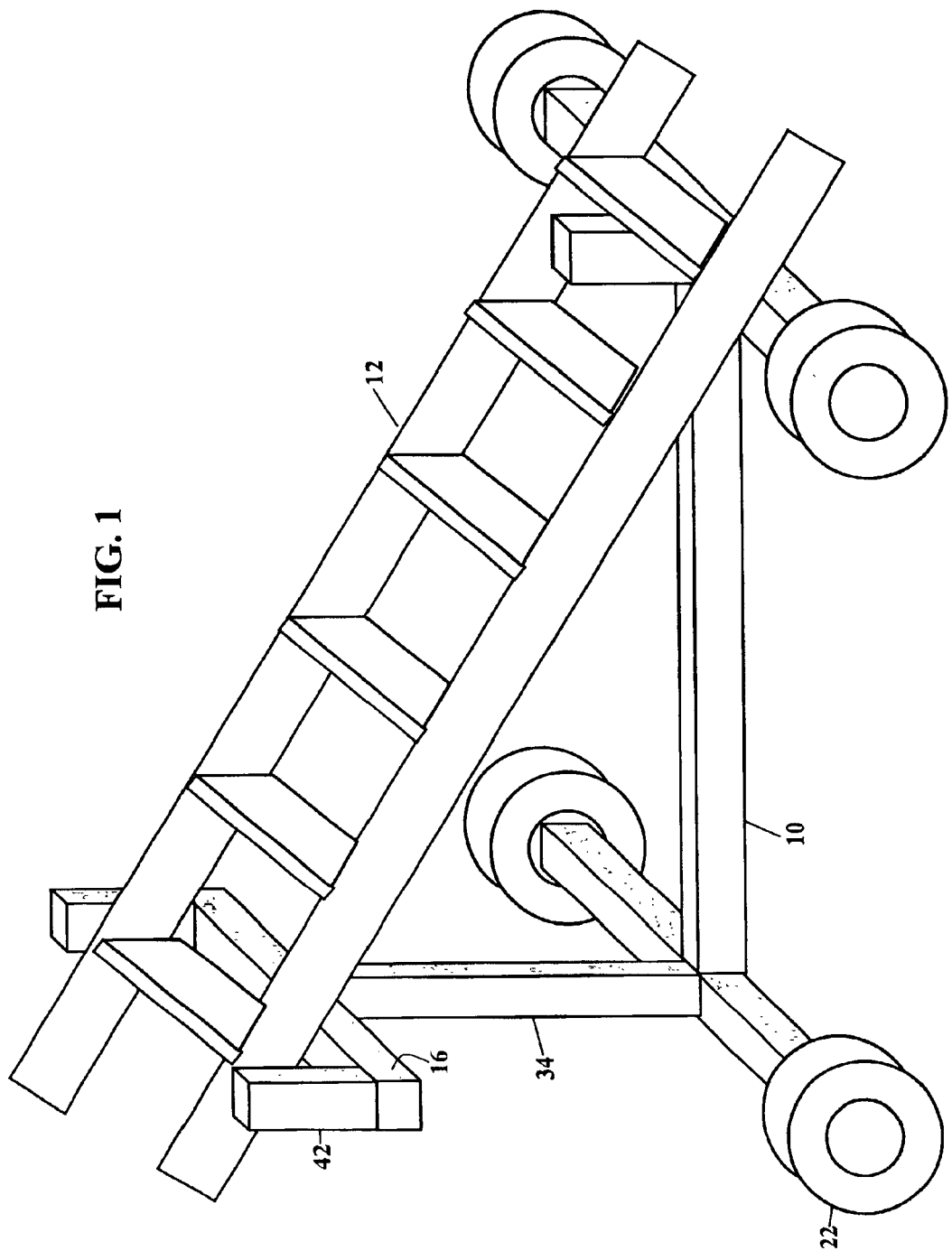
FIGS. 1 and 2 are isometric drawings illustrating one embodiment of a ladder dolly.
Figure 2:
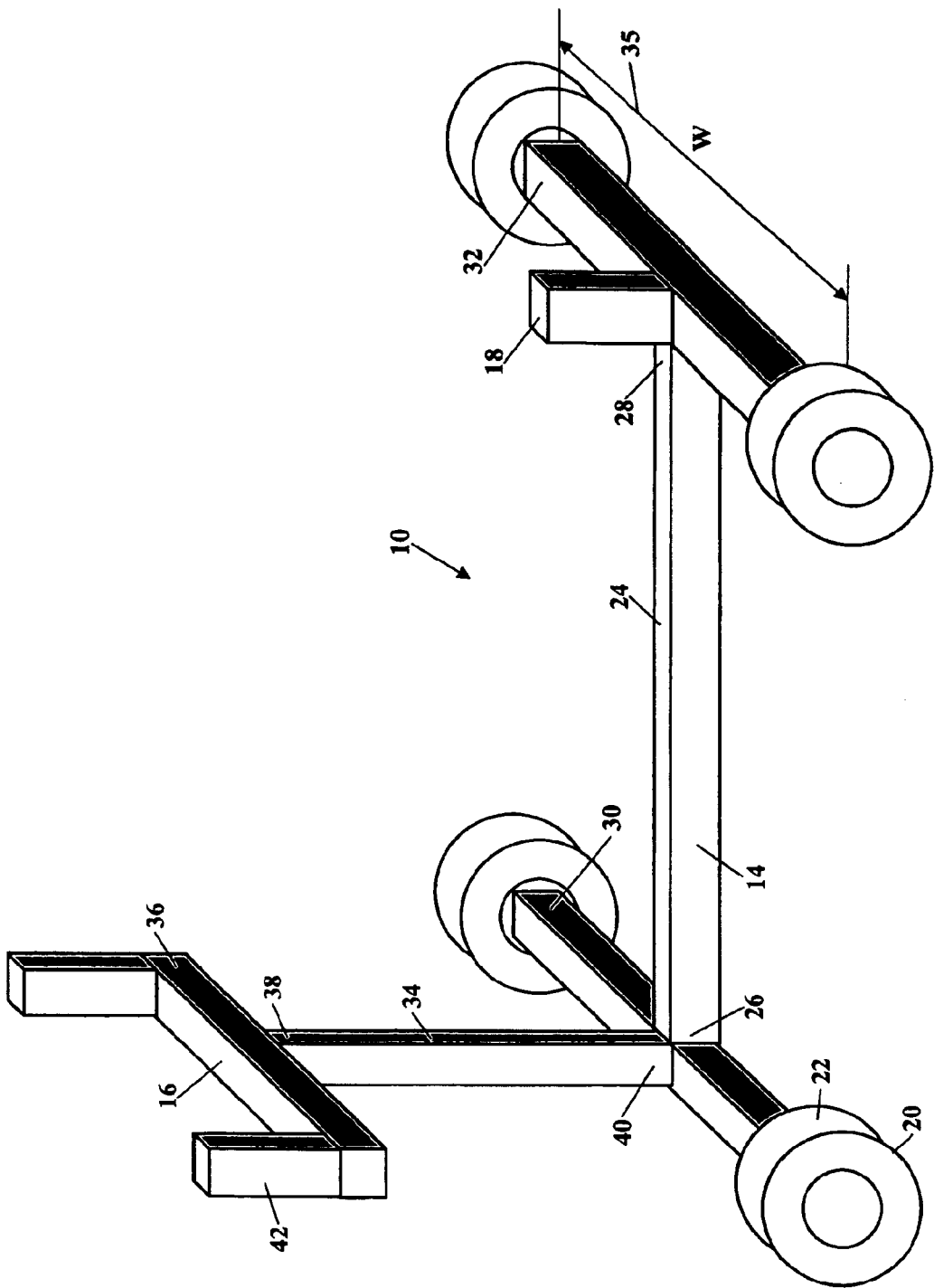

FIGS. 1 and 2 are isometric drawings illustrating one embodiment of a ladder dolly 10 for transporting a ladder 12. FIG. 1 shows the ladder dolly 10 supporting the ladder 12, while FIG. 2, for simplicity, only shows the ladder dolly 10. The dolly has a main frame 14, a ladder brace 16, and a ladder stop 18. The ladder brace 16 supports one portion or end of the ladder 12, while the ladder stop 18 abuts a rung at an opposite end of the ladder 12. The ladder dolly 10 also includes at least one tire and wheel assembly 20. The at least one tire and wheel assembly 20 rotatably mounts to the main frame 14 and permits the ladder dolly 10, and the ladder 12, to be easily maneuvered. Because the ladder dolly 10 is often used to transport the ladder 12 across lawns to a telephone pole, the tire and wheel assembly 20 preferably includes a turf tire 22. The turf tire 22 helps reduce chunking and cutting of customer lawns as the ladder dolly 10 is pushed or pulled across the lawn. The ladder dolly 10 may also include means for braking or for locking the at least one tire and wheel assembly 20. The means for braking or for locking the at least one tire and wheel assembly 20 would help prevent the ladder dolly 10 from rolling. The means for braking or for locking the at least one tire and wheel assembly 20 may comprises a foot brake, a locking bearing, a locking swivel bearing, or even chocks. The ladder dolly 10 allows an individual to transport the ladder 12 with less lifting of the ladder.

As FIG. 2 shows, the main frame 14 has a single longitudinal frame member 24. The single longitudinal frame member 24 extends between a first end 26 of the main frame 14 and a second end 28 of the main frame 14. The main frame 14 may have an elongated "H"-shape, with the single longitudinal frame member 24 extending between a first lateral frame member 30 and a second lateral frame member 32. The first lateral frame member 30 and the second lateral frame member 32 have a width "W" (shown as reference numeral 35 in FIG. 2) to provide stability for the ladder dolly 10. A pair of the tire and wheel assemblies 20 is shown rotatably mounted to the first lateral frame member 30 and to the second lateral frame member 32.

The ladder brace 16 supports one end of the ladder 12. The ladder brace 16 upwardly extends from the first end 26 of the main frame 14. The ladder brace 16 comprises a single support member 34 and a crossbar 36. The crossbar 36 is affixed to an upper end 38 of the single support member 34. The crossbar 36 is substantially perpendicular to the single support member 34. A lower end 40 of the single support member 34 is affixed to the first end 26 of the main frame 14. The crossbar 36 may include a hook 42 at an end of the crossbar 36. The hook 42 retains the ladder 12 within the ladder brace 16 and helps prevent the ladder 12 from laterally sliding off the ladder dolly 10.

The ladder dolly 10 also includes the ladder stop 18. The ladder stop 18 is preferably aligned along the single longitudinal frame member 24, and the ladder stop 18 upwardly extends from the second end 28 of the main frame 14. The ladder stop 18 may have any height, but the ladder stop 18 preferably has a sufficient height to retain a rung of the ladder 12. The ladder stop 18 also helps prevent the ladder 12 from sliding off the ladder dolly 10. When the ladder dolly 10 supports the ladder 12, the ladder stop 18 abuts a rung of the ladder 12. While a single ladder stop 18 is adequate to retain the ladder 12, more than one ladder stop 18 may upwardly extend from the second end 28 of the main frame 14.

Figure 3:
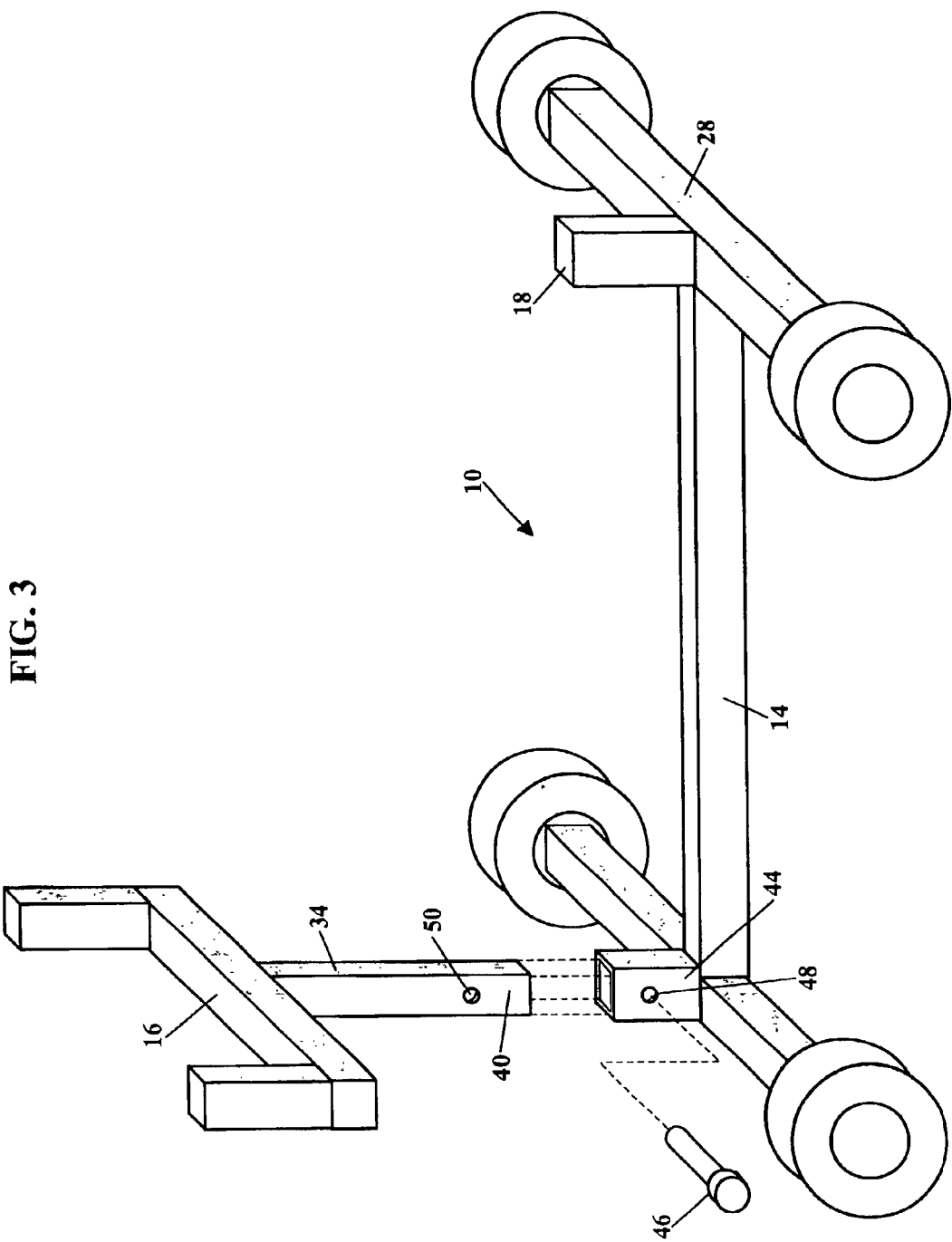
FIGS. 3–7 are drawings illustrating another embodiment of the ladder dolly.
Figure 4:
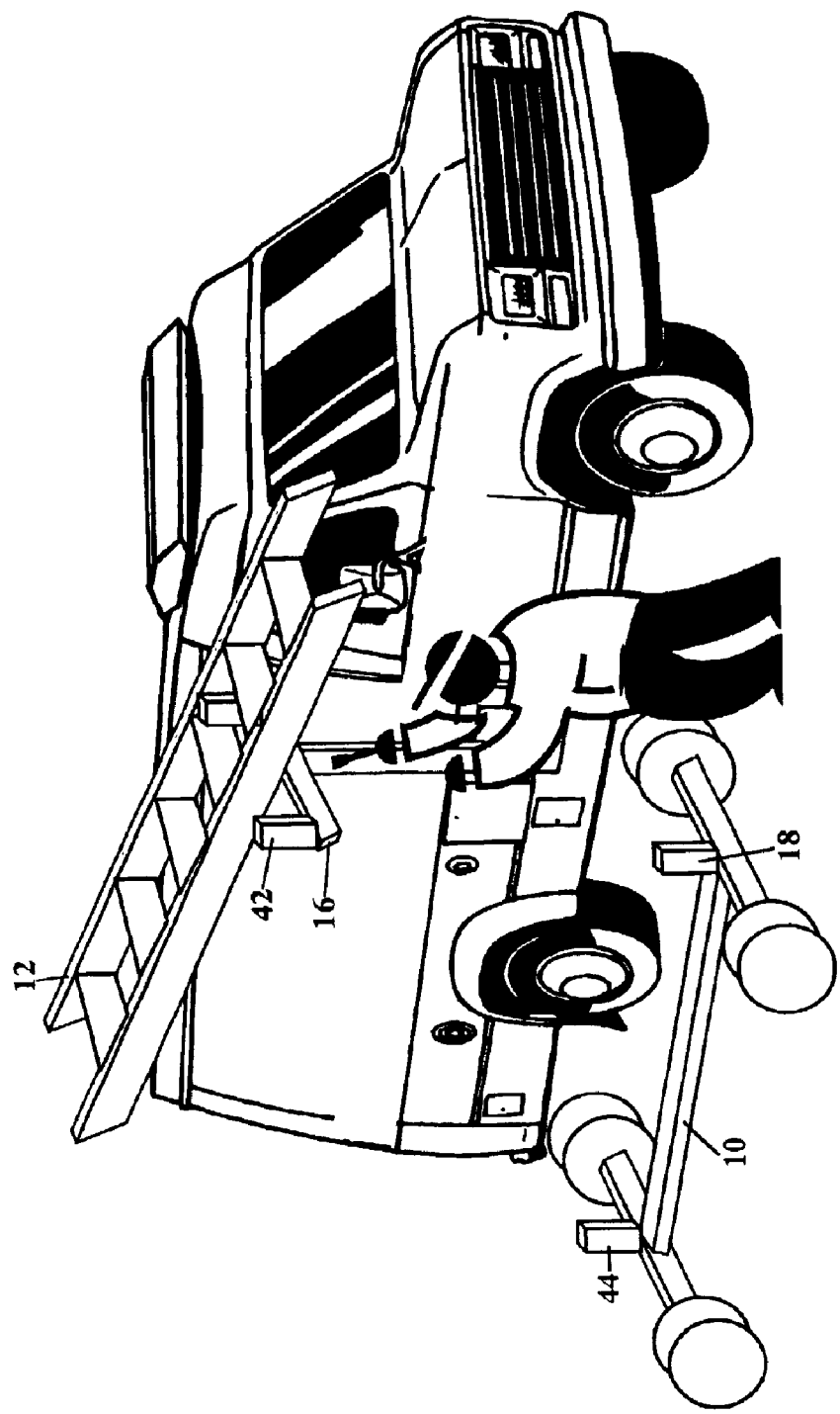
Figure 5:
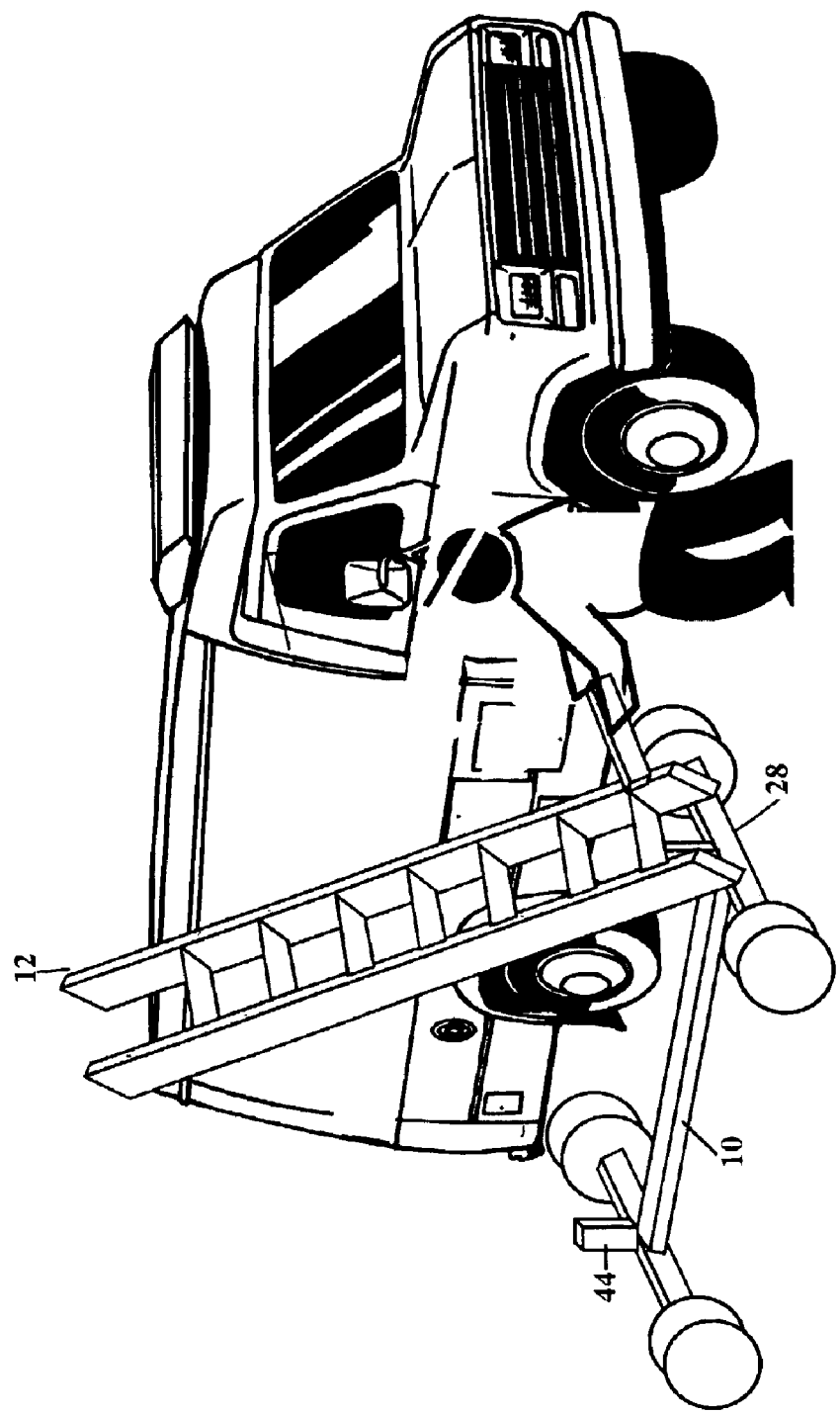
Figure 6:
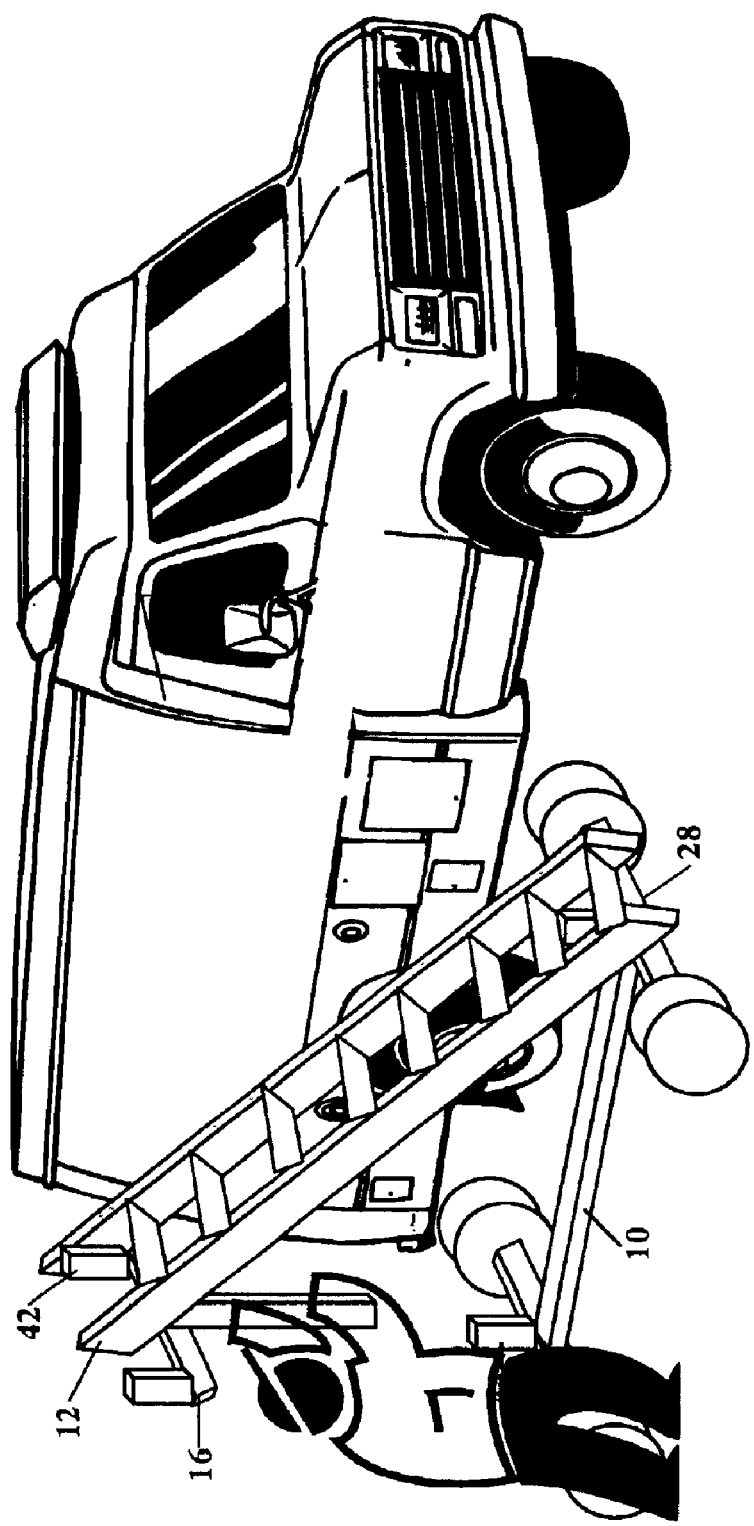
Figure 7:
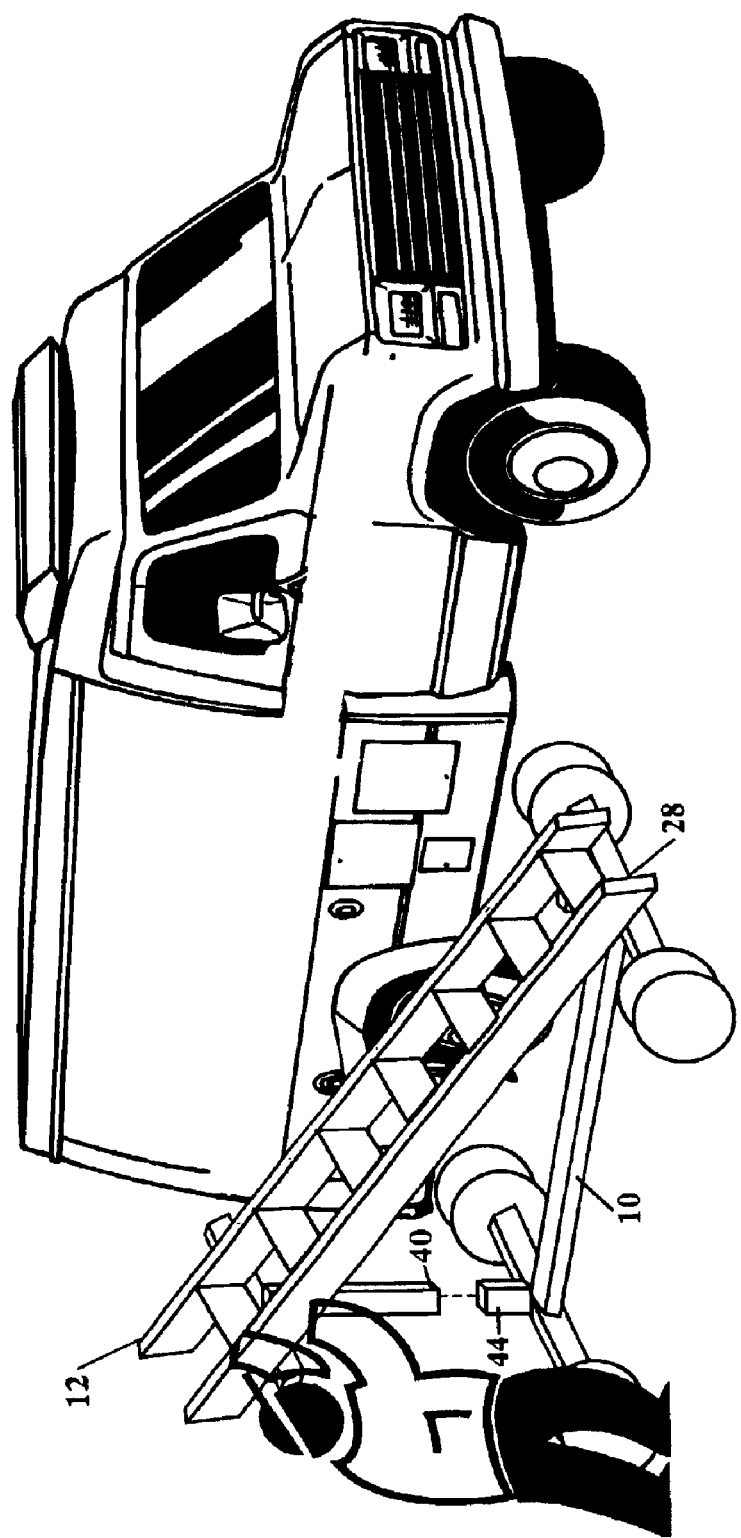

FIGS. 3–7 illustrate another embodiment of the ladder dolly 10. FIG. 3 is an isometric drawing illustrating this embodiment, and FIGS. 4–7 are schematics illustrating an individual using this embodiment of the ladder dolly 10. Here the ladder brace 16 detaches from the main frame 14. The single support member 34 inserts within a female receptacle 44. The female receptacle 44 has a tubular cross-section that is sized to accept the single support member 34. When the ladder brace 16 is detached, an individual may use the ladder brace 16 to retrieve and to stow the ladder (shown as reference numeral 12 in FIG. 1). If, for example, the ladder is stowed atop a van, or is stowed high upon a wall, the individual uses the ladder brace to retrieve the ladder. As FIG. 4 shows, the individual removes the ladder brace 16 from the female receptacle 44 and then uses the hook 42 to snag a leg or a rung of the ladder 12. FIG. 5 shows the individual then safely lowers the ladder brace 16, and thus the end of the ladder 12, onto the second end 28 of the ladder dolly 10. FIG. 6 shows the individual then uses the ladder brace 16 to snag an opposite end of the ladder 12. As FIG. 7 shows, the individual lowers the ladder brace 16, aligns the lower end 40 of the single support member 34 with the female receptacle 44, and inserts the lower end 40 into the female receptacle 44. A pin 46 or bolt may be inserted through pairs of aligned holes 48 and 50 in the female receptacle 44 and in the single support member 34 to secure the ladder brace 16 to the main frame 14.

The detachable ladder brace 16 may also be used to stow the ladder. If the ladder, for example, is to be stowed atop a van or other elevated storage position or location, the individual also uses the detachable ladder brace 16 to snag a rung or leg of the ladder. The individual lifts the end of the ladder and, holding the single support member 34, places the end of the ladder atop the van's roof rack or other rigging. The individual unhooks the ladder brace 16 from the ladder and repeats lifting the other end of the ladder. The detachable ladder brace 16 is thus particularly helpful when stowing, or retrieving, the ladder from places the individual has trouble reaching.

Figure 8:
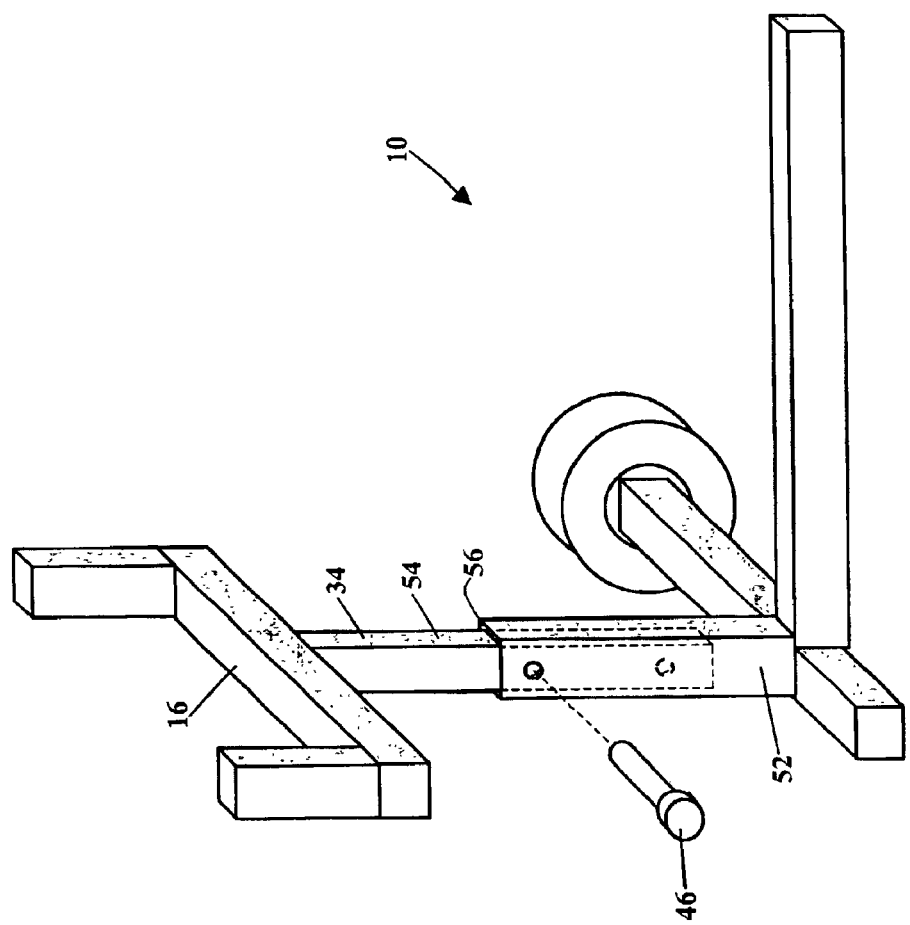
FIG. 8 is an isometric drawing of yet another embodiment of the ladder dolly.

FIG. 8 is an isometric drawing of yet another embodiment of the ladder dolly 10. Here the single support member 34 is telescopic to accommodate varying lengths of ladders. The telescopic feature of the single support member 34 also increases the individual's reach when stowing and retrieving the ladder. The telescopic single support member 34 has an outer section 52 and an inner section 54. The outer section 52 has a tubular cross-section 56, and the inner section 54 is sized such that the inner section 54 slides within the outer section 52. The inner section 54 may be removed from the outer section 52 and thus the ladder brace may be used to retrieve and to stow the ladder (as shown and described with reference to FIGS. 3–7). The pin 46 inserts through the outer section 52 and the inner section 54 to prevent the single support member 34 from collapsing in length during use.

Although only one outer 52 and inner 54 section are shown, the telescoping single support member 34 may have successive pairs of inner and outer sections. The successive pairs of inner and outer sections are sized such that an inner section of one pair is also the outer section of an adjoining pair (e.g., similar to a telescopic antenna). Although the pin 46 prevents the single support member 34 from collapsing in length, any means of securing or of locking the inner section 54 within the outer section 52 is within the scope of this invention, such as detents, pawls, pins, threading locks, and threaded bolts.

Figure 9:
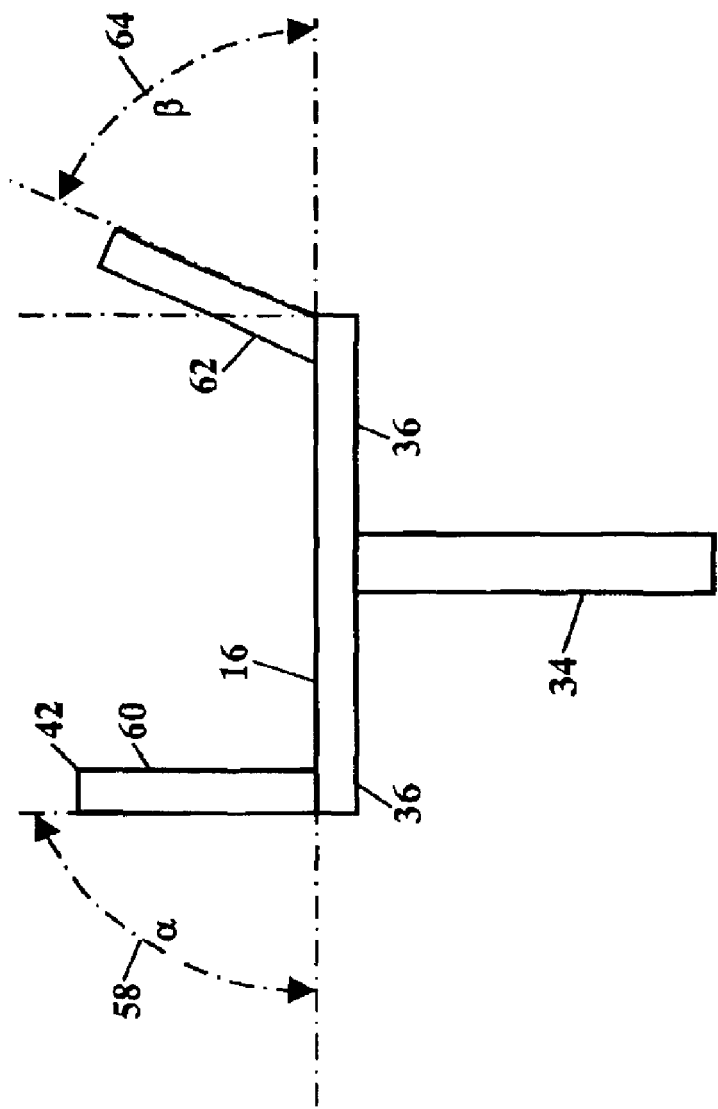
FIGS. 9–11 are orthographic front views of a ladder brace according to embodiments of the invention.
Figure 10:
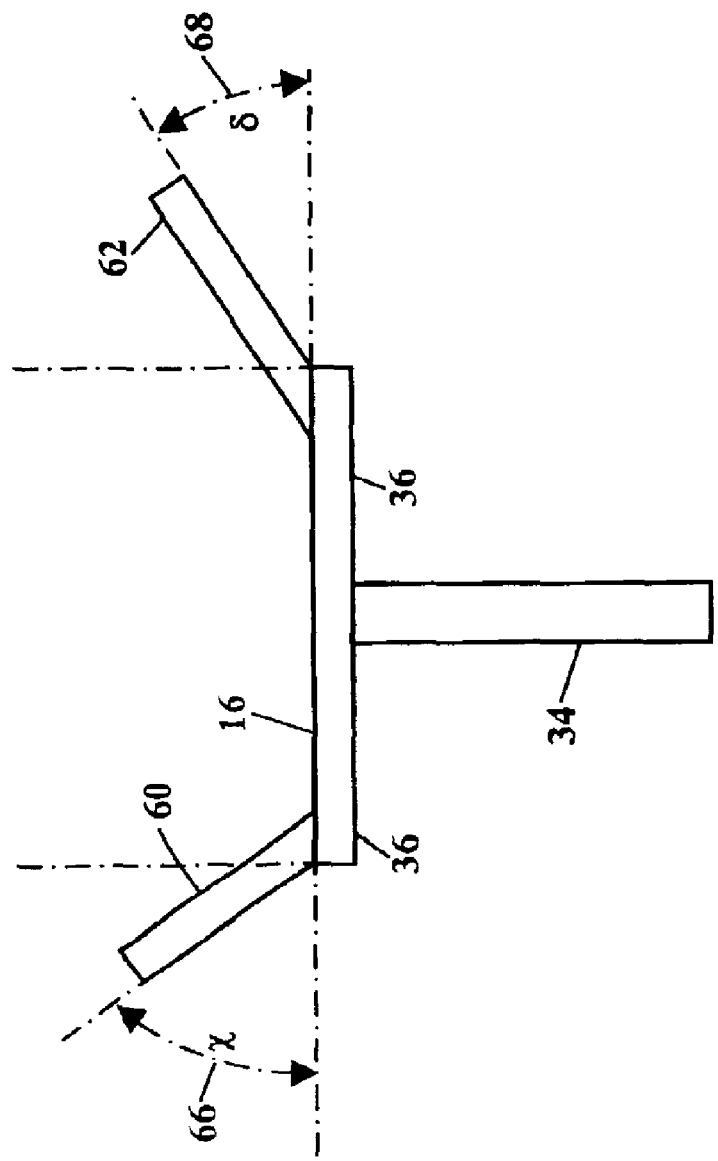
Figure 11:
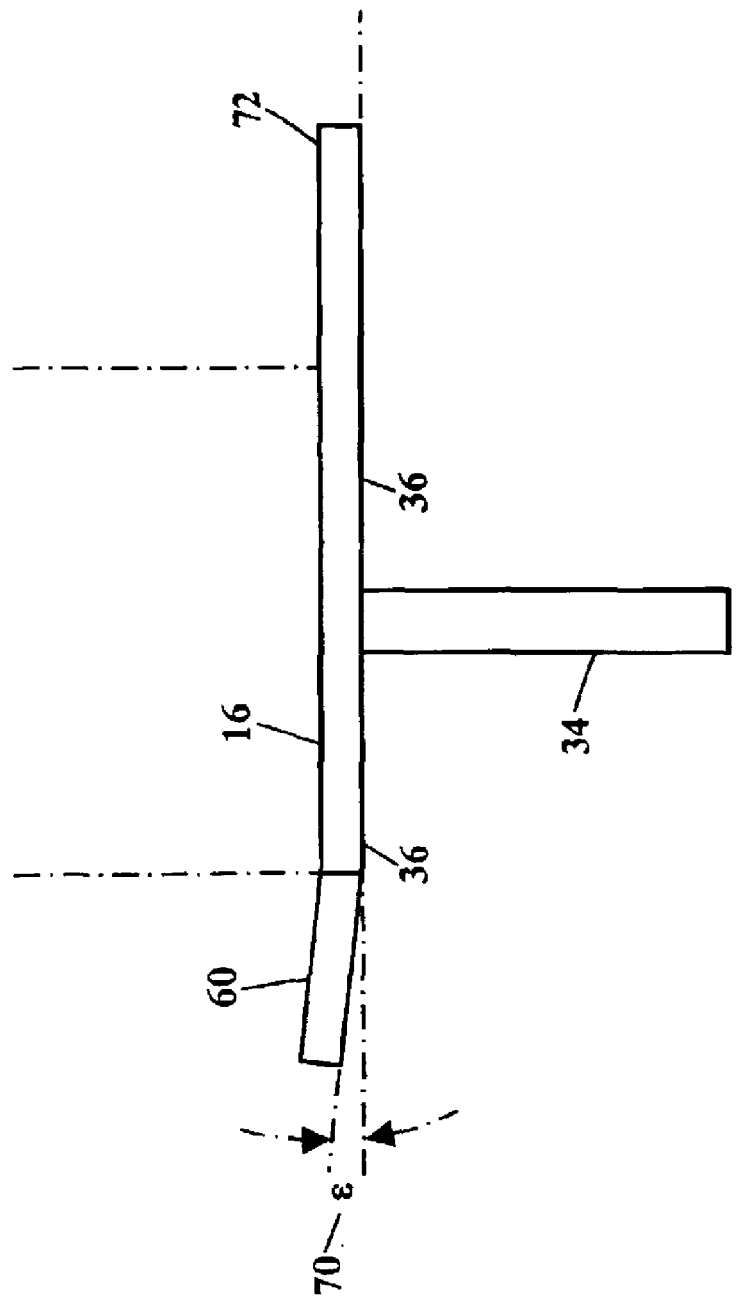

FIGS. 9–11 are orthographic front views of the ladder brace 16. These views illustrate various orientations of the hook 42. An individual, as mentioned above, snags the ladder (shown as reference numeral 12 in FIG. 1) with the hook 42 when stowing and retrieving the ladder. The hook 42, however, also retains the ladder within the ladder brace 16 and helps prevent the ladder from laterally sliding off the dolly (shown as reference numeral 10 in FIGS. 1–8). One orientation of the hook 42, therefore, may help snag the ladder, but this same orientation may not best retain the ladder within the ladder brace 16. Similarly, another orientation may best retain the ladder within the ladder brace 16, but, not easily snag the ladder. The ladder brace 16, as FIGS. 9–11 show, preferably resembles a two-pronged fork. The fork retains the ladder between the prongs, but the prongs may also be used to snag the ladder from atop the van.

FIG. 9 shows a ninety degree (90°) angle $\alpha$ (shown as reference numeral 58) between a left hook 60 and the crossbar 36. This ninety degree (90°) angle $\alpha$ best retains the ladder within the ladder brace 16, but this orientation, in some situations, may make snagging the ladder more difficult. FIG. 9 also shows a right hook 62. The right hook 62 has a lesser seventy-five degree (75°) angle $\beta$ (shown as reference numeral 64) between the right hook 62 and the crossbar 36. This seventy-five degree (75°) angle $\beta$ still adequately retains the ladder, but this orientation still makes snagging the ladder difficult for shorter individuals.

FIG. 10 illustrates still more orientations. FIG. 10 shows a sixty degree (60°) angle $\chi$ (shown as reference numeral 66) between the left hook 60 and the crossbar 36. This sixty degree (60°) angle $\chi$ adequately retains the ladder and improves the individual's ability to snag the ladder. FIG. 10 also shows a thirty degree (30°) angle $\delta$ (shown as reference numeral 68) between the right hook 62 and the crossbar 36. This thirty degree (30°) angle $\delta$ adequately retains the ladder on the most typical of terrains. This thirty degree (30°) orientation also allows shorter individuals to snag the ladder from atop a van's roof rack.

FIG. 11 shows even more orientations. FIG. 11 shows a fifteen degree (15°) angle $\epsilon$ (shown as reference numeral 70) between the left hook 60 and the crossbar 36. This fifteen degree (15°) orientation still allows most individuals to snag the ladder from atop the van, but this orientation permits the ladder to laterally slide within the ladder brace 16. A zero degree (0°) orientation (e.g., no oriented hook) on a right side 72 of the crossbar 36 allows the ladder to laterally slide in the ladder brace 16. While the lack of an oriented hook allows the individual to snag the ladder from atop the van, the lack of an oriented hook also makes lowering the ladder more difficult. As the individual lowers the ladder from atop the van, the lack of an oriented hook may sometimes allow the ladder to slip off the crossbar 36. The angle, therefore, between the hook 42 and the crossbar 36 is preferably between about 0° and about 90°, more preferably between 15° and 75°, and most preferably between 30° and 60°.

Figure 12:
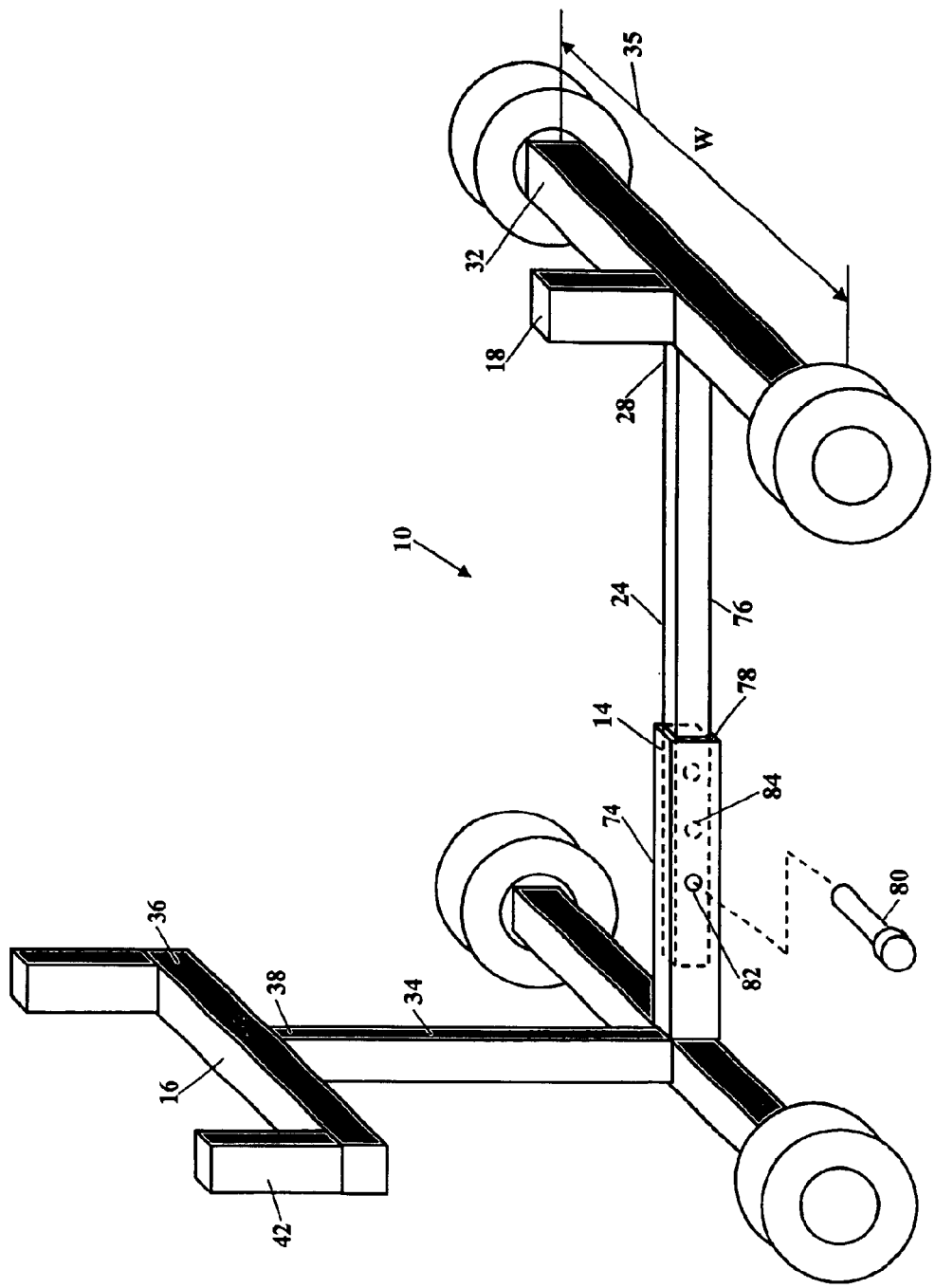
FIG. 12 is an isometric view of a main frame according to embodiments of the invention.

FIG. 12 is an isometric view of the main frame 14. FIG. 12 shows the single longitudinal frame member 24 may be telescopic to accommodate varying lengths of ladders. The telescopic single longitudinal frame member 24 has an outer section 74 and an inner section 76. The outer section 74 has a tubular cross-section 78, and the inner section 76 is sized such that the inner section 76 slides within the outer section 74. A pin 80 may insert through aligned holes 82 and 84 in the outer section 74 and in the inner section 76 to prevent the single longitudinal frame member 24 from collapsing in length during use. Although only one outer 74 and inner 76 section are shown, the telescoping single longitudinal frame member 24 may have successive pairs of inner and outer sections. The successive pairs of inner and outer sections are sized such that an inner section of one pair is also the outer section of an adjoining pair. While the pin 80 prevents the single longitudinal frame member 24 from collapsing, any means of securing or of locking the inner section 76 within the outer section 74 is within the scope of this invention, such as detents, pawls, threading locks, and threaded bolts.

Figure 13:
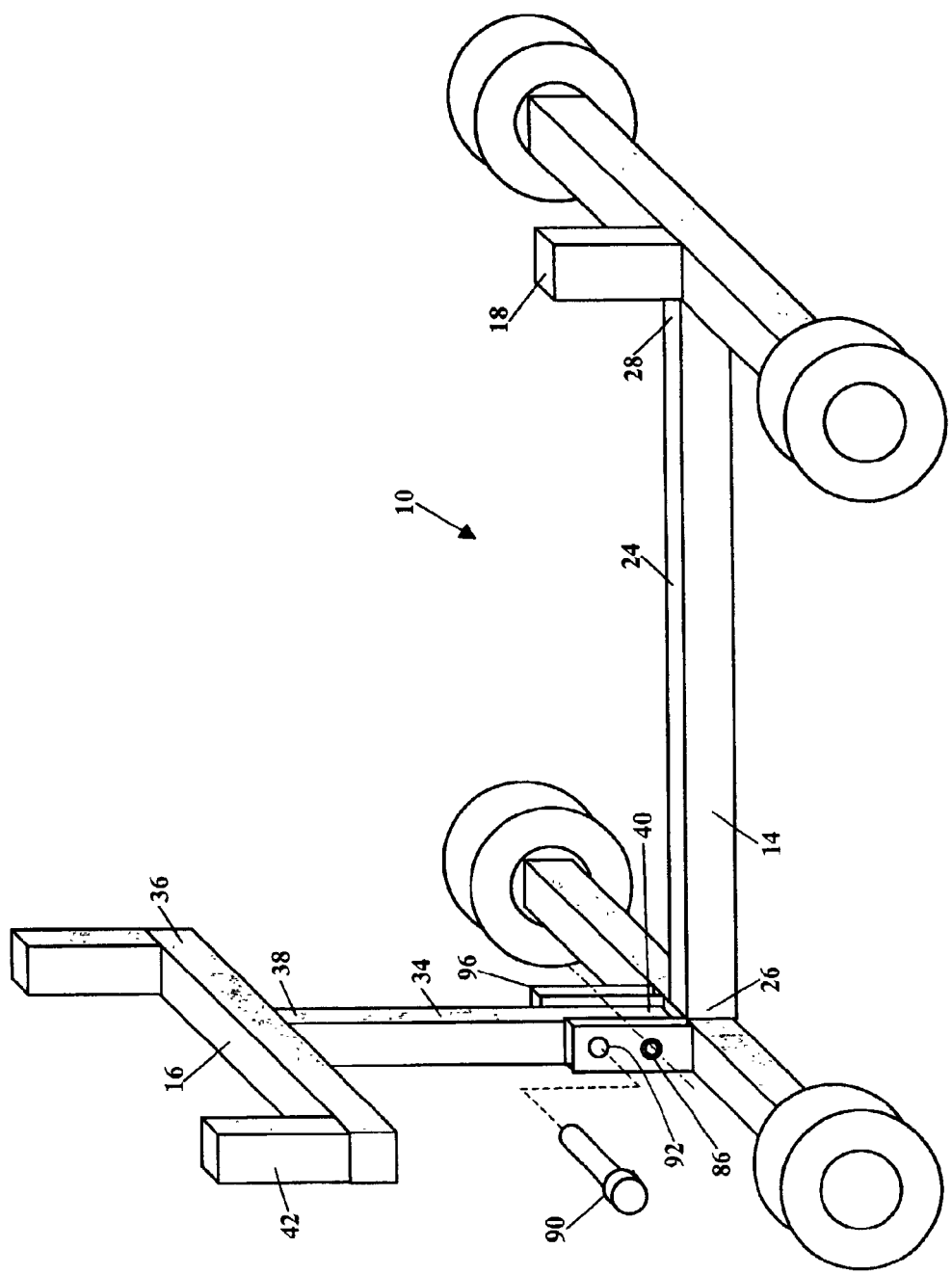
FIGS. 13 and 14 are isometric views of a collapsible ladder dolly according to embodiments of the invention.
Figure 14:
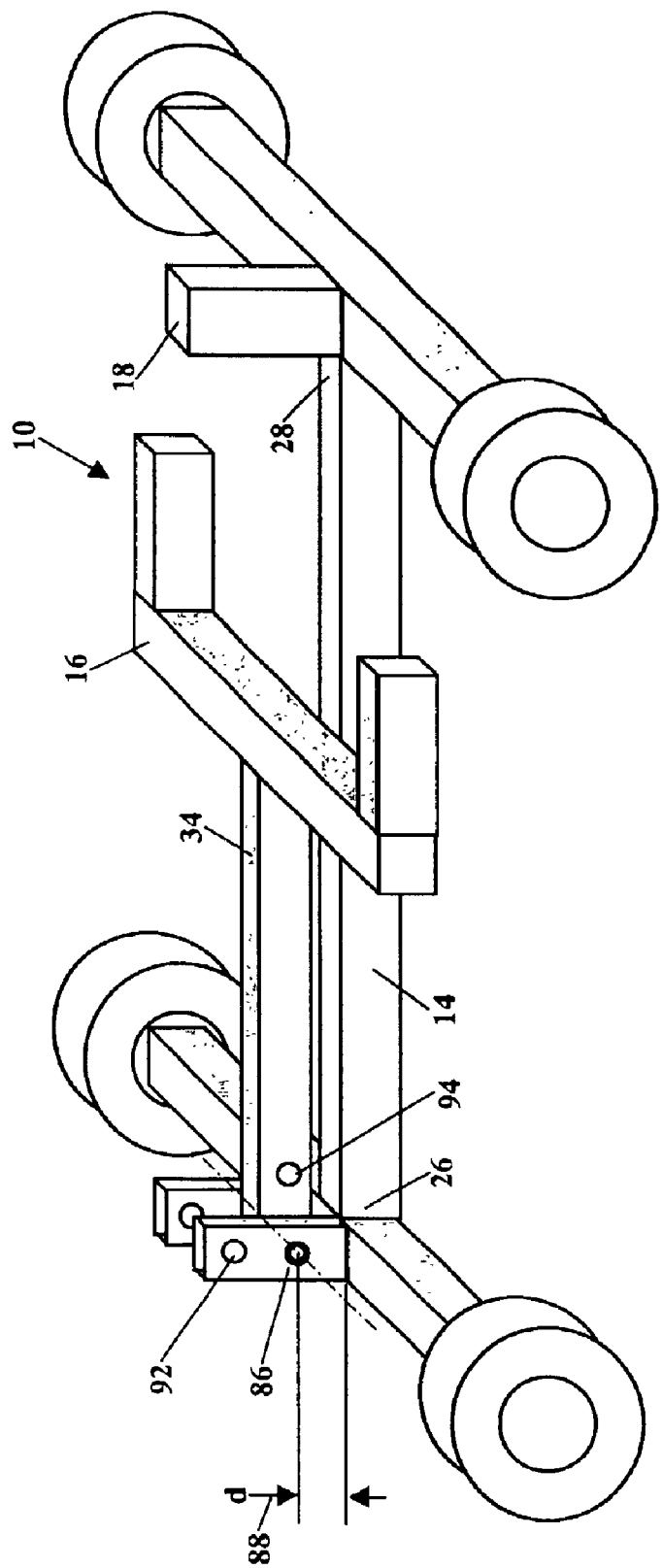

FIGS. 13 and 14 are isometric views of a collapsible ladder dolly 10. Here the lower end 40 of the single support member 34 has a pivotal connection 86 to the main frame 14. The pivotal connection 86 is offset a distance "d" (shown as reference numeral 88 in FIG. 13) from the main frame 14. This pivotal connection 86 allows the single support member 34 to fold inward and collapse toward the main frame 14. A pin 90, additionally, inserts through aligned holes 92 and 94 in a bracket 96 and in the lower end 40. When the single support member 34 is in an upright position (as shown in FIG. 13), the pin 90 prevents the single support member 34 from rotating about the pivotal connection 86 and, thus, collapsing and folding. When the pin 90, however, is removed (as FIG. 14 shows), the single support member 34 may pivot about the pivotal connection 86 and, thus, collapse and fold downward and inward toward the main frame 14. This collapsing feature allows the individual to stow the ladder dolly 10 in the back of the van and, yet, still have room in the van for tools, conduit, and other equipment. The pivotal connection 86 may be a hinge, bolt, pin, or other means of pivoting the single support member 34 inward toward the main frame 14.

Figure 15:
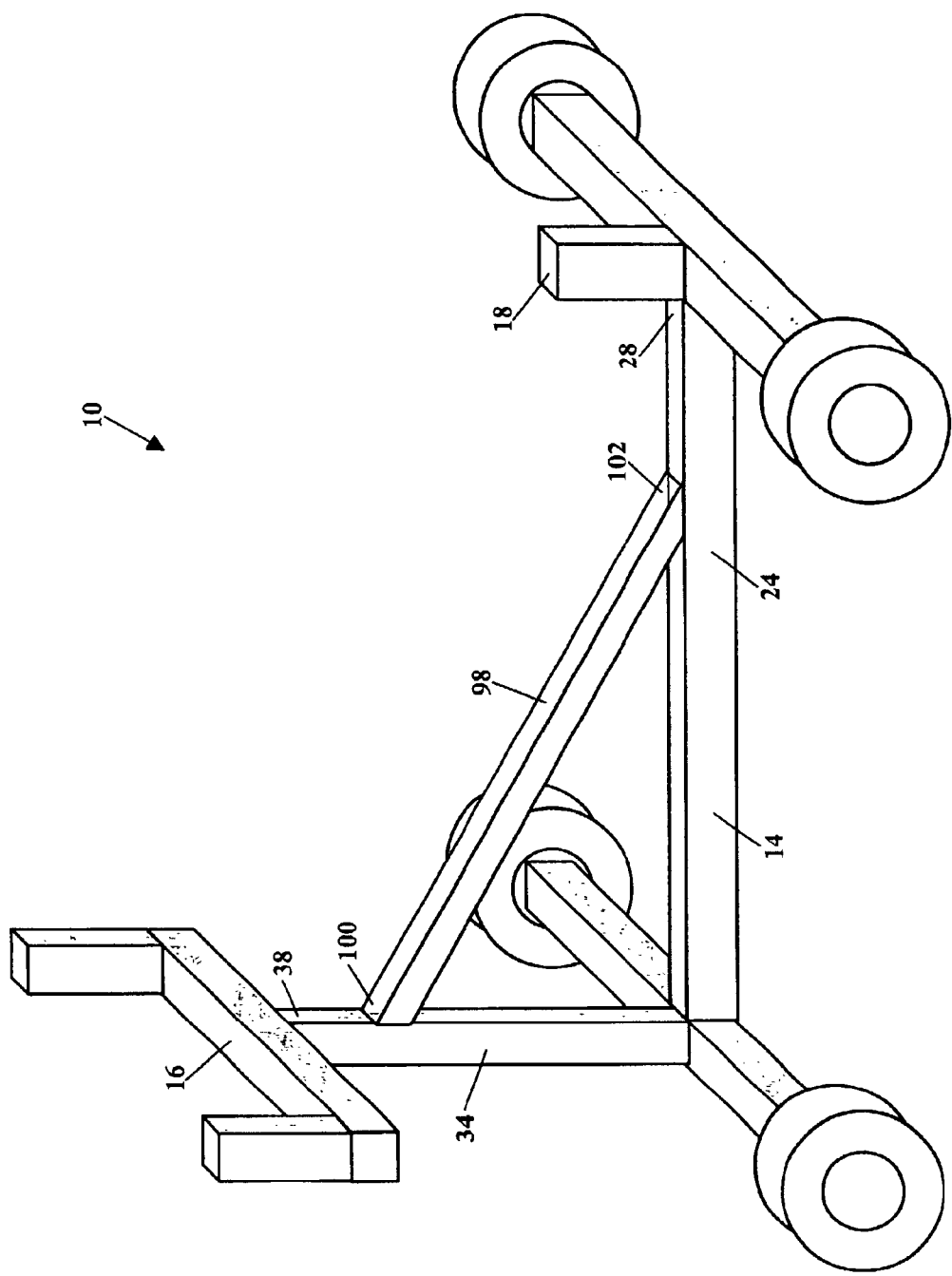
FIG. 15 is an isometric view of yet another alternate embodiment of the ladder dolly.

FIG. 15 is an isometric view of yet another alternate embodiment of the ladder dolly 10. A single diagonal brace 98 upwardly inclines from the single longitudinal frame member 24 to the single support member 34. The diagonal brace 98 provides additional load support to the ladder brace 16. An upper end 100 of the diagonal brace 98 affixes near the upper end 38 of the single support member 34, and a right end 102 of the diagonal brace 98 affixes near the second end 28 of the single longitudinal frame member 24.

Figure 16:
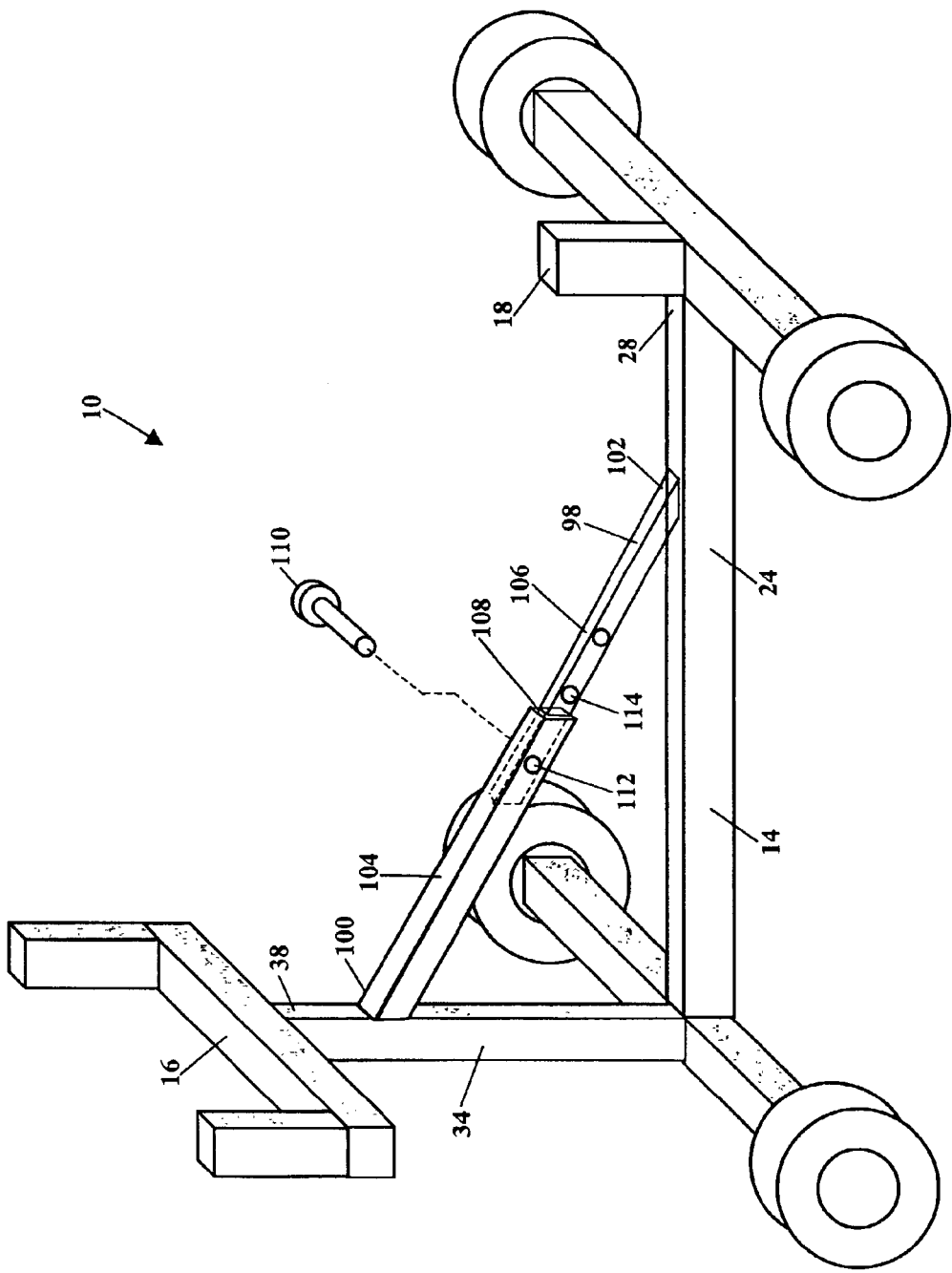
FIG. 16 is an isometric view of still another alternative embodiment of the ladder dolly.

FIG. 16 is an isometric view of still another alternative embodiment of the ladder dolly 10. Here the diagonal brace 98 is telescopic to accommodate varying lengths of ladders and varying orientations of the ladder dolly 10. The telescopic diagonal brace 98 has an outer section 104 and an inner section 106. The outer section 104 has a tubular cross-section 108, and the inner section 106 is sized such that the inner section 106 slides within the outer section 104. A pin 110 may insert through aligned holes 112 and 114 in the outer section 104 and the inner section 106 to prevent the diagonal brace 98 from collapsing in length during use. Although only one outer 104 and inner 106 section are shown, the telescoping diagonal brace 98 may have successive pairs of inner and outer sections. The successive pairs of inner and outer sections are sized such that an inner section of one pair is also the outer section of an adjoining pair. While the pin 110 prevents the diagonal brace 98 from collapsing, any means of securing or of locking the inner section 106 within the outer section 104 is within the scope of this invention, such as detents, pawls, threading locks, and threaded bolts.

Figure 17:
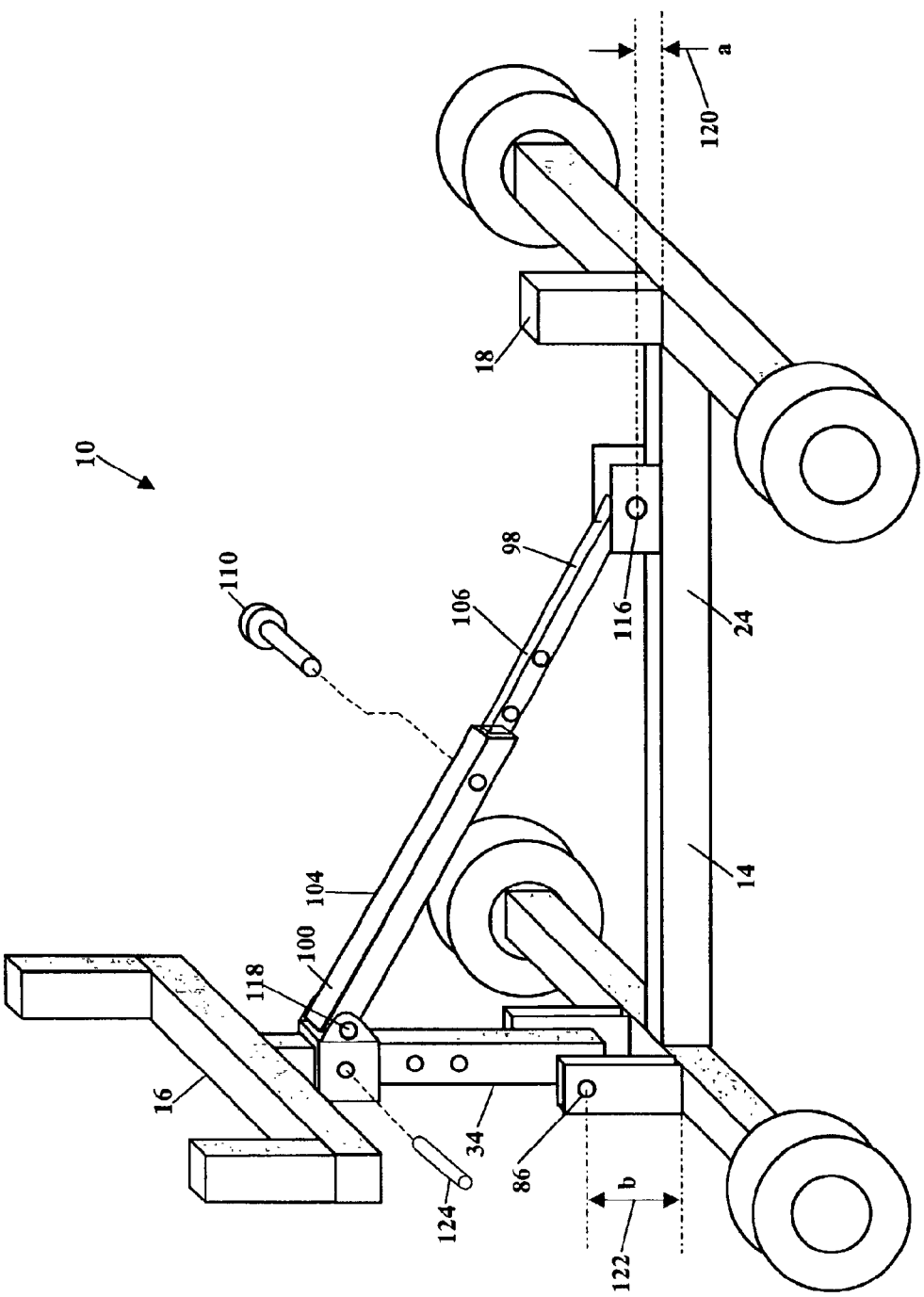
FIGS. 17, 18, and 19 are isometric views of another alternative embodiment for the ladder dolly.
Figure 18:
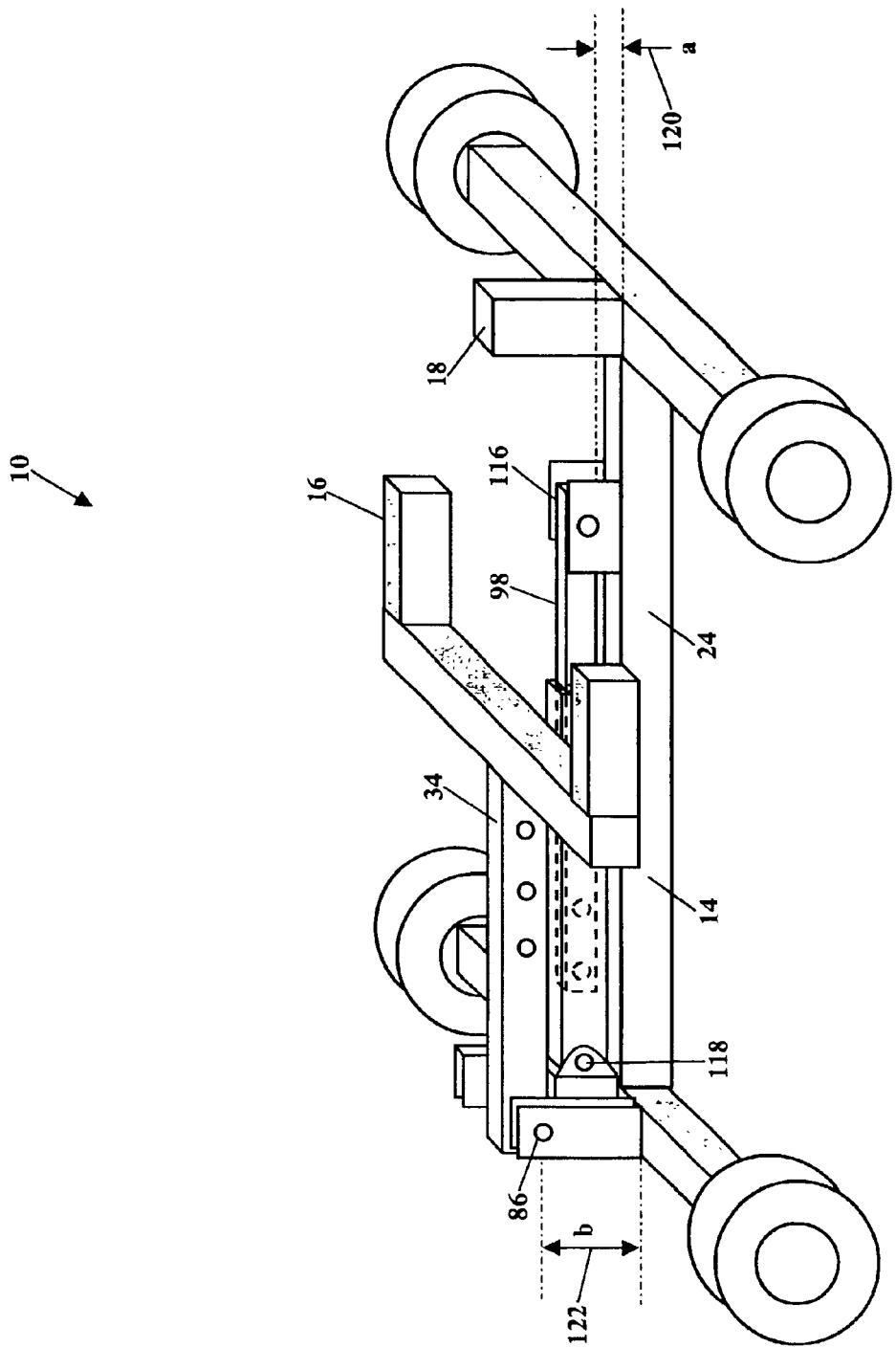
Figure 19:
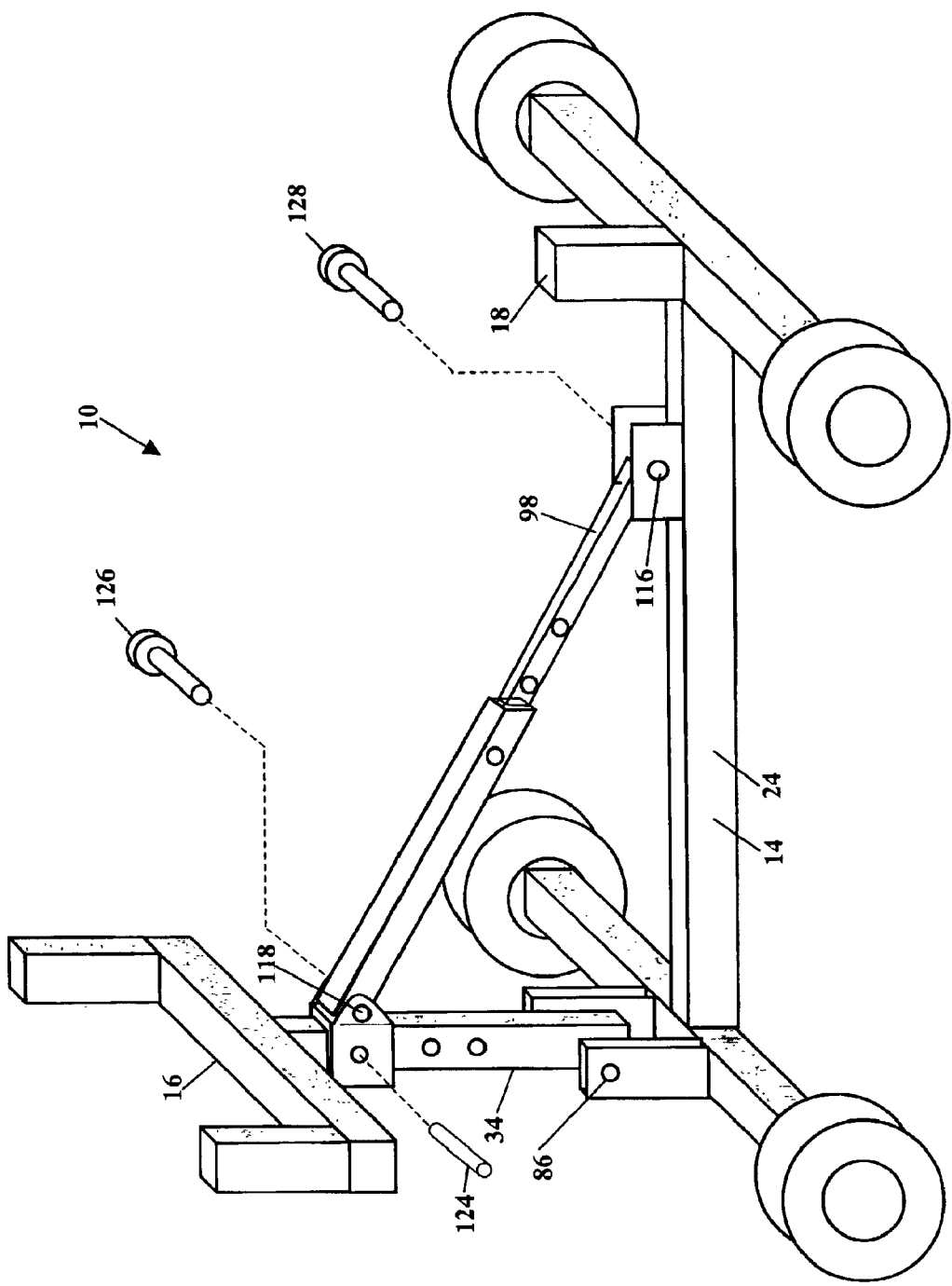

FIGS. 17, 18, and 19 are isometric views of another alternative embodiment for the ladder dolly 10. Here the single support member 34 and the diagonal brace 98 collapse and fold inward for easy stowage. The single support member 34 has the pivotal connection 86. The diagonal brace 98 has a second pivotal connection 116 to the single longitudinal frame member 24, and the diagonal brace 98 has a third pivotal connection 118 to the single support member 34. The second pivotal connection 116 is offset a distance "a" (shown as reference numeral 120 in FIG. 17) from the main frame 14, while the pivotal connection 86 is offset a distance "b" (shown as reference numeral 122) from the main frame 14. When the single support member 34 is in an upright position (as FIG. 17 shows), a pin 124 inserts through the upper end 100 of the diagonal brace 98. When an individual wishes to collapse the ladder dolly 10, the individual removes the pin 110 and the pin 124. As FIG. 18 shows, the second pivotal connection 116 and the third pivotal connection 118 allow the diagonal brace 98 to fold downward and inward to collapse toward the main frame 14. The upper end 100 of the diagonal brace 98 slideably mounts to the single support member 34, such that when diagonal brace 98 folds downward and inward, the upper end 100 pivots about the third pivotal connection 118 and also slides downward along the single support member 34. After the diagonal brace 98 is folded and collapsed, FIG. 18 also shows the single support member 34 pivots about the pivotal connection 86 and collapses inward toward the diagonal brace 98.

The collapsible dolly 10 shown in FIGS. 17 and 18 may also be disassembled. The second pivotal connection 116 and the third pivotal connection 118 may be releasably affixed for disassembly. FIG. 19, for example, shows the second pivotal connection 116 and the third pivotal connection 118, respectively, including removable pins 126 and 128. When the pin 126 is inserted, the pin 126 pivotally affixes the diagonal brace 98 to the single support member 34. When the pin 126 is removed, however, the diagonal brace 98 is released from the single support member 34. The pin 128, likewise, pivotally affixes the diagonal brace 98 to the single longitudinal frame member 24. When the pin 128 is removed, however, the diagonal brace 98 is released from the single longitudinal frame member 24. This ladder dolly 10 may thus be disassembled and stored in the back of the individual's van. When the individual arrives at the work site, the individual may then assemble the ladder dolly 10. The individual may also orient the single support member 34 to accommodate various ladder lengths.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A dolly for transporting a ladder, comprising:

a main frame having a first end and a second end, the main frame including only a unitary longitudinal frame member extending between the first end and the second end;

a ladder brace upwardly extending from the first end of the main frame, the ladder brace for supporting one end of the ladder, the ladder brace having a single support member fixed to, and upwardly extending from, the first end of the main frame, with the single support member including a crossbar, the crossbar affixed to an upper end of the single support member; and a ladder stop for abutting a rung of the ladder, wherein the dolly allows an individual to transport the ladder.

2. A dolly according to claim 1, wherein the ladder brace detaches from the main frame.

3. A dolly according to claim 1, wherein the crossbar further includes a hook at one end of the crossbar, the hook for snagging the ladder.

4. A dolly according to claim 3, wherein an angle between the hook and the crossbar is preferably between 15° and 75°.

5. A dolly according to claim 3, wherein an angle between the hook and the crossbar is preferably between 30° and 60°.

6. A dolly according to claim 1, further comprising at least one wheel and tire assembly rotatably mounted to the main frame.

* * * * *